(12) United States Patent (10) Patent No.: US 7,564,444 B2
Rosenberg et al. (45) Date of Patent: *Jul. 21, 2009

(54) SYSTEM AND METHOD OF APPLYING FORCE FEEDBACK TO A MANIPULANDUM WHEEL UTILIZED WITH A GRAPHICAL USER INTERFACE

(75) Inventors: Louis B. Rosenberg, San Jose, CA (US); Bruce M. Schena, Menlo Park, CA (US)

(73) Assignee: Immersion Corporation, San Jose, CA (US)

( * ) Notice: Subject to any disclaimer, the term of this patent is extended or adjusted under 35 U.S.C. 154(b) by 503 days.

This patent is subject to a terminal disclaimer.

(21) Appl. No.: 11/252,505

(22) Filed: Oct. 17, 2005

(65) Prior Publication Data

US 2006/0033716 A1 Feb. 16, 2006

Related U.S. Application Data

(63) Continuation of application No. 09/678,110, filed on Oct. 2, 2000, now Pat. No. 6,956,558, which is a continuation of application No. 09/049,155, filed on Mar. 26, 1998, now Pat. No. 6,128,006.

(51) Int. Cl.
*G09G 5/00* (2006.01)
*G06F 3/01* (2006.01)
(52) U.S. Cl. .................. 345/156; 345/163; 715/701
(58) Field of Classification Search ......... 345/156–167, 345/184
See application file for complete search history.

(56) References Cited

U.S. PATENT DOCUMENTS 4,795,296 A 1/1989 Jau 4,868,549 A 9/1989 Affinito et al.

(Continued)

FOREIGN PATENT DOCUMENTS

JP 09-026850 1/1997

OTHER PUBLICATIONS

Akamatsu, Motoyuki et al., "Multimodal Mouse: A Mouse-Type Device with Tactile and Force Display," Presence, vol. 3 No. 1, 1994, 73-80.

(Continued)

*Primary Examiner*—Duc Q Dinh
(74) *Attorney, Agent, or Firm*—Kilpatrick Stockton LLP

(57) ABSTRACT

A force feedback wheel is provided on a mouse or other interface device manipulated by a user. A sensor detects a position of the mouse in a workspace and sends a position signal to a connected host computer indicating that position. A rotatable wheel is mounted upon the manipulandum and rotates about a wheel axis, where a wheel sensor provides a wheel signal to the host computer indicating a rotary position of the wheel. A wheel actuator coupled to the rotatable wheel applies a computer-modulated force to the wheel about the wheel axis. The mouse can be a standard mouse or a force-feedback mouse, where forces are applied in the mouse workspace. The host computer is preferably running a graphical environment, where the force applied to the wheel can correspond with an event or interaction displayed in the graphical environment. The wheel can also be included on other devices such as remote controls and radios.

21 Claims, 6 Drawing Sheets

U.S. PATENT DOCUMENTS

| | | | |
|---|---|---|---|
| 5,095,303 A | 3/1992 | Clark et al. | |
| 5,186,629 A | 2/1993 | Rohen | |
| 5,235,868 A | 8/1993 | Culver | |
| 5,530,455 A | 6/1996 | Gillick et al. | |
| 5,555,894 A | 9/1996 | Doyama et al. | |
| 5,712,725 A | 1/1998 | Faltermeier et al. | |
| 5,742,278 A * | 4/1998 | Chen et al. | 345/156 |
| 5,749,577 A | 5/1998 | Couch et al. | |
| 5,781,172 A | 7/1998 | Engel et al. | |
| 5,784,052 A | 7/1998 | Keyson | |
| 5,808,568 A | 9/1998 | Wu | |
| 5,841,423 A | 11/1998 | Carroll, Jr. et al. | |
| 5,912,661 A | 6/1999 | Siddiqui | |
| 5,914,705 A | 6/1999 | Johnson et al. | |
| 5,956,016 A * | 9/1999 | Kuenzner et al. | 345/156 |
| 5,973,670 A * | 10/1999 | Barber et al. | 345/157 |
| 6,097,964 A | 8/2000 | Nuovo et al. | |
| 6,161,126 A | 12/2000 | Wies et al. | |
| 6,219,032 B1 | 4/2001 | Rosenberg et al. | |
| 6,219,034 B1 | 4/2001 | Elbing et al. | |
| 6,252,583 B1 | 6/2001 | Braun et al. | |
| 6,487,421 B2 | 11/2002 | Hess et al. | |

OTHER PUBLICATIONS

Gobel, Matthias et al., "Tactile Feedback Applied to Computer Mice," International Journal of Human-Computer Interaction, vol. 7(1), 1995, pp. 1-24.

IBM Corporation, "Mouse Ball-Actuating Device with Force and Tactile Feedback," vol. 32, No. 9B, Feb. 1990, pp. 230-235.

Jackson, K. M., "Linearity of Radio-Frequency Transducers," Med. & Biol. Eng. and Computer, Jul. 1977, 15, pp. 446-449.

* cited by examiner

SYSTEM AND METHOD OF APPLYING FORCE FEEDBACK TO A MANIPULANDUM WHEEL UTILIZED WITH A GRAPHICAL USER INTERFACE

The present application is a continuation of U.S. patent application Ser. No. 09/678,110 filed Oct. 2, 2000 (Now U.S. Pat. No. 6,956,558), which is a continuation of U.S. patent application Ser. No. 09/049,155 filed Mar. 26, 1998, (Now U.S. Pat. No. 6,128,006). The above U.S. Patents in the name of inventors Louis B. Rosenberg and Bruce M. Schena, all commonly assigned to and owned by Immersion Corporation, the applications entitled, "Force Feedback Mouse Wheel".

BACKGROUND OF THE INVENTION

The present invention relates generally to interface devices for allowing humans to interface with computer systems, and more particularly to mechanical computer interface devices that allow the user to provide input to computer systems and provide force feedback to the user.

Computer systems are used extensively in many different industries to implement many applications. Users can interact with a visual environment displayed by a computer on a display device to perform functions on the computer, play a game, experience a simulation or "virtual reality" environment, use a computer aided design (CAD) system, browse the World Wide Web, or otherwise influence events or images depicted on the screen. One visual environment that is particularly common is a graphical user interface (GUI). GUI's present visual images which describe various graphical metaphors of a program or operating system implemented on the computer. Common GUI's include the Windows® operating system from Microsoft Corporation, the MacOS® operating system from Apple Computer, Inc., and the X-Windows GUI for Unix operating systems. The user typically moves a user-controlled graphical object, such as a cursor or pointer, across a computer screen and onto other displayed graphical objects or screen regions, and then inputs a command to execute a given selection or operation. Other programs or environments also may provide user-controlled graphical objects such as a cursor and include browsers and other programs displaying graphical "web pages" or other environments offered on the World Wide Web of the Internet, CAD programs, video games, virtual reality simulations, etc. In some graphical computer environments, the user may provide input to control a 3-D "view" of the graphical environment, as in CAD or 3-D virtual reality applications.

The user interaction with and manipulation of the computer environment is achieved using any of a variety of types of human-computer interface devices that are connected to the computer system controlling the displayed environment. A common interface device for GUI's is a mouse or trackball. A mouse is moved by a user in a planar workspace to move a graphical object such as a cursor on the 2-dimensional display screen in a direct mapping between the position of the user manipulandum and the position of the cursor. This is typically known as "position control", where the motion of the graphical object directly correlates to motion of the user manipulandum. One drawback to traditional mice is that functions such as scrolling a document in a window and zooming a view displayed on the screen in or out are typically awkward to perform, since the user must use the cursor to drag a displayed scroll bar or click on displayed zoom controls. These types of functions are often more easily performed by "rate control" devices, i.e. devices that have an indirect or abstract mapping of the user manipulandum to the graphical object, such as pressure-sensitive devices. Scrolling text in a window or zooming to a larger view in a window are better performed as rate control tasks, since the scrolling and zooming are not directly related, to the planar position of a mouse. Similarly, the controlled velocity of a simulated vehicle is suitable for a rate control paradigm.

To allow the user easier control of scrolling, zooming, and other like functions when using a mouse, a "scroll wheel" or "mouse wheel" has been developed and has become quite common on computer mice. A mouse wheel is a small finger wheel provided on a convenient place on the mouse, such as between two mouse buttons, which the user may rotate to control a scrolling or zooming function. Most commonly, a portion of the wheel protrudes out of the top surface of the mouse which the user can move his or her finger over. The wheel typically includes a rubber or other frictional surface to allow a user's finger to easily rotate the wheel. In addition, some mice provide a "clicking" wheel that moves between evenly-spaced physical detent positions and provides discrete positions to which the wheel can be moved as well as providing the user with some physical feedback as to how far the wheel has rotated. The wheel is most commonly used to scroll a document in a text window without having to use a scroll bar, or to zoom a window's display in or out without selecting a separate zoom control. The wheel may also be used in other applications, such as a game, drawing program, or simulation.

One problem with existing mouse wheels is that they are quite limited in functionality. The wheel has a single frictional feel to it, and provides the user with very little tactile feedback as to the characteristics of the scrolling or zooming function employed. Even the mouse wheels having physical detents are limited in that the detents are spaced a constant distance apart and have a fixed tactile response, regardless of the scrolling or zooming task being performed or the characteristics of the document or view being manipulated. Providing additional physical information concerning the characteristics of the task that the wheel is performing, as well as allowing the wheel to perform a variety of other tasks in a GUI or other environment, would be quite useful to a user.

SUMMARY OF THE INVENTION

The present invention is directed to an interface device which is connected to a host computer and provides a rotatable wheel having force feedback. The force feedback wheel provides greater functionality and relays greater tactile information to the user concerning the control task being performed with the wheel than a standard non-force-feedback wheel.

More particularly, an interface device and method for interfacing a user's input with a host computer and providing force feedback to the user includes a user manipulandum contacted and manipulated by a user and moveable in a planar workspace with respect to a ground surface. A manipulandum sensor detects a position of the user manipulandum in the planar workspace and sends a position signal to the host computer indicating a position of the user manipulandum in the workspace. A rotatable wheel is mounted upon the user manipulandum and rotates about a wheel axis, where a wheel sensor provides a wheel signal to the host computer indicating a rotary position of the wheel. A wheel actuator coupled to the rotatable wheel applies a computer-modulated force to the wheel about the wheel axis.

The user manipulandum can include a mouse object or other type of object. In a standard mouse implementation, the manipulandum sensor includes a ball and roller assembly. In a force feedback mouse implementation, one or more additional actuators are included for applying a force to the manipulandum in the workspace. A mechanical linkage having multiple members can be coupled between the manipulandum actuators and the manipulandum. The wheel can be oriented in a variety of ways; for example, the wheel can rotate about an axis parallel to the planar workspace. The wheel actuator can be directly coupled to the wheel, or can be coupled to the wheel by a drive mechanism such as a belt drive. In some embodiments, the wheel can be depressed into a housing of the manipulandum. A local microprocessor can also be provided in the interface device to control the actuator to apply the force on the wheel.

The host computer is preferably running a graphical environment, where the force applied to the wheel corresponds with an event or interaction displayed in the graphical environment. The event can be the scrolling of a displayed document as controlled by the sensed rotation of the wheel, or a zooming or panning of a view in the graphical environment. In one embodiment, the cursor's motion is influenced by the rotation of the wheel, such that the event can be an interaction of a cursor with a graphical object. The force can also be, for example, a damping force sensation, an inertial force sensation, a friction force sensation, a force detent sensation, an obstruction force sensation, a texture sensation, a jolt sensation, or a vibration sensation. Different modes, such as isotonic and isometric modes, can also be provided, where force sensations appropriate to each mode are applied to the wheel.

In a different embodiment, a force feedback wheel device of the present invention provides input to an electronic device. The wheel device includes a wheel rotatably coupled to a housing and rotatable about an axis, a computer-modulated actuator coupled to the wheel for generating a simulated detent sensation on the wheel, where the force detent is provided at a predetermined user-preferred rotational position of the wheel, and a sensor that senses rotation of the wheel and provides a wheel signal to the electronic device indicating a rotary position of the wheel. The wheel can be included on a remote control device for remotely sending signals to the electronic device, or on the housing of the electronic device itself. The electronic device can be any of a variety of devices or appliances; for example, a radio can include the force wheel for providing user-preferred detents at radio station frequencies spaced irregularly about the rotational range of the wheel.

The apparatus and method of the present invention provides an interface device including a force feedback wheel that allows a user to conveniently provide input to manipulate functions or events in a host computer application program or electronic device. The force feedback wheel allows substantially greater control and flexibility than previous mouse wheels or other knobs, and the force feedback allows the wheel to control a variety of useful functions in a graphical environment which prior wheels are not able to control.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
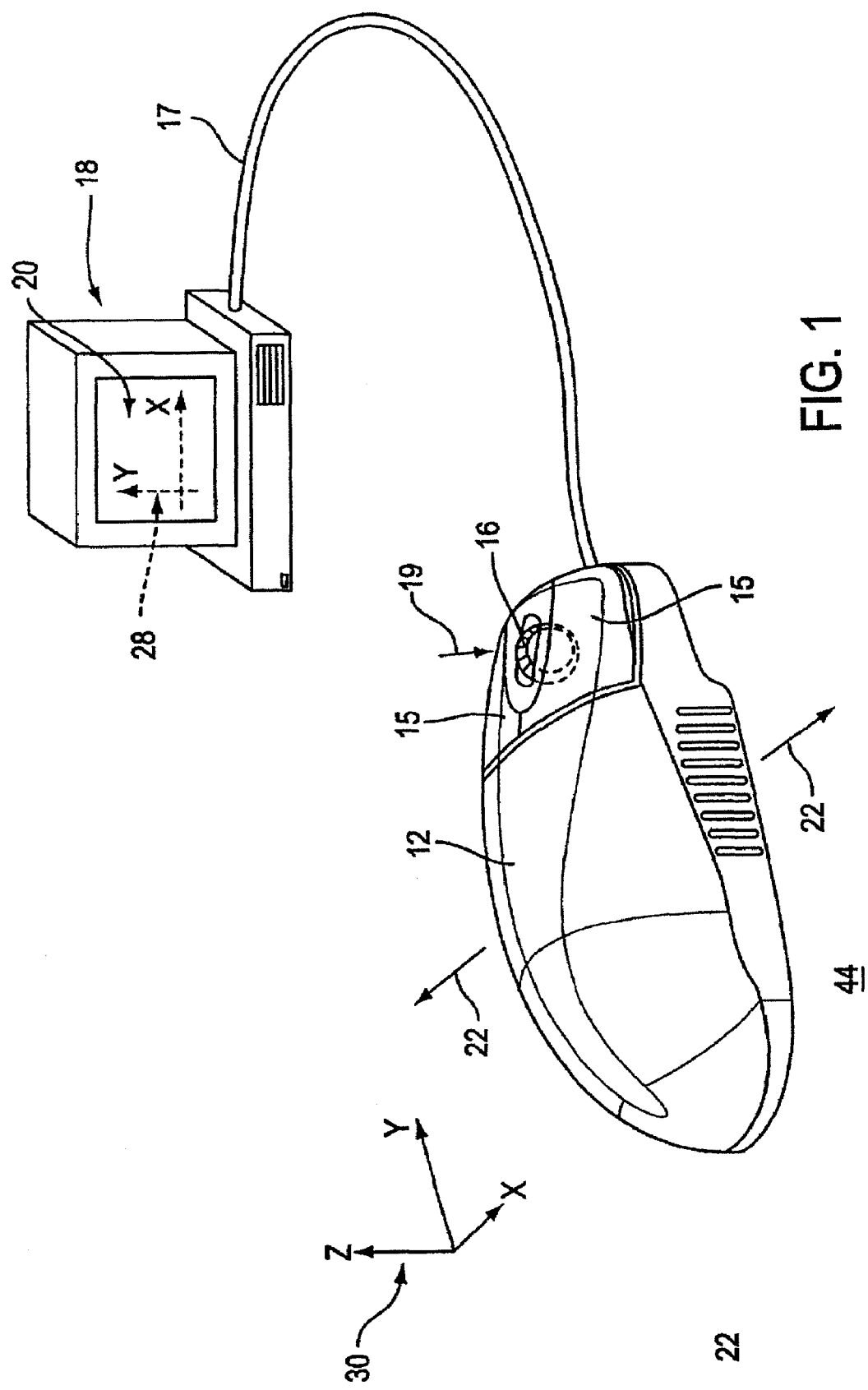
FIG. 1 is a perspective view of one embodiment of a mouse interface system including a force feedback wheel of the present invention.

FIG. 1 is a perspective view of a mouse 12 including a force feedback mouse wheel of the present invention. Mouse 12 rests on a ground surface 44 such as a tabletop or mousepad. A user grasps the mouse 12 and moves the mouse in a planar workspace on the surface 44 as indicated by arrows 22. Mouse 12 may be moved anywhere on the ground surface 44, picked up and placed in a different location, etc. A frictional ball and roller assembly (not shown) is provided on the underside of the mouse 12 to translate the motion of the mouse 12 into electrical position signals, which are sent to a host computer 18 over a bus 17 as is well known to those skilled in the art. In other embodiments, different mechanisms can be used to convert mouse motion to position or motion signals received by the host computer. It should be noted that the term "mouse" as used herein indicates an object 12 generally shaped to be grasped or contacted by a user from above and moved within a substantially planar workspace (and additional degrees of freedom if available). Typically, a mouse is a smoothly- or angular-shaped compact unit that snugly fits under a user's hand, fingers, and/or palm, but can be implemented as other objects as well.

Mouse 12 includes buttons 15 and a mouse wheel 16. Buttons 15 can be pressed by the user to provide an associated signal to the host computer 18 over bus 17. Additional buttons can be provided in other embodiments of mouse 12. Mouse wheel 16 of the present invention is provided, for example, between buttons 15 to allow easy access for a user's finger. A wheel 16 can alternatively or additionally be provided in a location easily accessed by the user's thumb. The wheel as shown only partially protrudes from an aperture 13 in the housing of the mouse 12 and preferably is provided with a frictional surface, such as a rubber-like surface or a series of ridges or bumps to allow the user's finger to grip the wheel more easily. Wheel 16 is operative to rotate in place in when the user's finger pushes the wheel in either rotational direction. When the user rotates the wheel, a corresponding signal indicating the amount of rotation and the direction of rotation is sent to host computer 18 over bus 17. For example, the wheel signal can be used by host computer to scroll a document in a window, pan a view, or zoom a view. The wheel 16 is coupled to an actuator in mouse 12 which applies forces to wheel 16, which is described in greater detail below. Typically, wheel 16 is provided in a Y-orientation and rotates about an axis oriented in the X-direction as shown in FIG. 1, where the wheel controls vertical (Y-direction) motion of a graphical object displayed by host 18. In other embodiments, a wheel can be provided in an X-orientation that rotates about a Y-axis, and which can control horizontal (X-direction) motion of a host graphical object. In yet other embodiments, two or more wheels 16 can be provided on mouse 12 in different orientations to provide the user with multiple wheel controls. In still other embodiments, wheel 16 can be provided as a trackball (or similar approximately spherical object) provided in a socket in mouse 12, and which can be moved in both X- and Y-directions and have forces applied thereto.

Furthermore, in some embodiments, wheel 16 may be depressed by the user as indicated by arrow 19. The wheel, when pressed, causes contacts to be electrically connected and provides a signal to host computer 18. Wheel 16 thus can also operate as an additional mouse button 15. A mechanical/electrical interface (not shown) is preferably included to sense manipulations of the wheel 16 and transmit force to the wheel. In the preferred embodiment, power is provided to actuators over bus 17 (e.g. when bus 17 includes a USB interface). The structure and operation of wheel 16 and the interface is described in greater detail with respect to FIGS. 5-9.

Host computer 18 is preferably a personal computer or workstation, such as an IBM-PC compatible computer or Macintosh personal computer, or a SUN or Silicon Graphics workstation. For example, the computer 18 can operate under the Windows™ or MS-DOS operating system in conformance with an IBM PC AT standard. Alternatively, host computer system 18 can be one of a variety of home video game systems commonly connected to a television set, such as systems available from Nintendo, Sega, or Sony. In other embodiments, host computer system 18 can be a "set top box" which can be used, for example, to provide interactive television functions to users, or a "network-" or "internet-computer" which allows users to interact with a local or global network using standard connections and protocols such as used for the Internet and World Wide Web. Host computer preferably includes a host microprocessor, random access memory (RAM), read only memory (ROM), input/output (I/O) circuitry, and other components of computers well-known to those skilled in the art.

Host computer 18 preferably implements a host application program with which a user is interacting via mouse 12 and other peripherals, if appropriate. The application program includes force feedback functionality to provide appropriate force signals to mouse 12. For example, the host application program can be a GUI, simulation, video game, Web page or browser that implements HTML or VRML instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Unix, etc. are also referred to as "application programs." In one preferred embodiment, an application program utilizes a graphical user interface (GUI) to present options to a user and receive input from the user. Herein, computer 18 may be referred as displaying "graphical objects" or "computer objects." These objects are not physical objects, but are logical software unit collections of data and/or procedures that may be displayed as images by computer 18 on display screen 20, as is well known to those skilled in the art. A displayed cursor, a view displayed by a GUI window, a portion of a document displayed in the window, or a simulated cockpit of an aircraft can all be considered graphical objects. The host application program checks for input signals received from the mouse 12, displays updated graphical objects and other events as appropriate, and outputs force signals across bus 17 to mouse 12 to control forces output on wheel 16, as described in greater detail below. In alternate embodiments, a separate local microprocessor can be included in mouse 12 to locally control force output on wheel 16. Such a microprocessor can be provided in embodiments, such as the embodiment of FIG. 1, having no other force feedback except through wheel 16. A local microprocessor is described in greater detail with respect to FIG. 4.

Display device 20 is typically included in host computer 18 and can be a standard display screen (LCD, CRT, etc.), 3-D goggles, or any other visual output device. Typically, the host application provides images to be displayed on display device 20 and/or other feedback, such as auditory signals. For example, display screen 20 can display images from a GUI. Images describing a first person point of view can be displayed, as in a virtual reality game or simulation. Or, images describing a third-person perspective of objects, backgrounds, etc. can be displayed.

Mouse 12 can be used, for example, to control a computer-generated graphical object such as a cursor or pointer displayed in a graphical computer environment, such as a GUI. The user can move the mouse in 2D planar workspace to move the cursor to graphical objects in the GUI or perform other tasks. The user may use wheel 16 to scroll text documents, perform zooming functions on views in windows, perform panning functions, or perform other rate control tasks. Forces output on wheel 16 provide information about the rate control task performed by the wheel, and allow the user to perform additional control functions as described with reference to FIG. 9. For example, the computer system may provide force feedback commands to the wheel when the user moves the graphical object against a generated surface such as an edge of a window, a virtual wall, etc. It thus appears and feels to the user that the graphical object is contacting a real surface. In some embodiments, the user may influence the movement of the cursor with the rotation of wheel 16. In other graphical environments, such as a virtual reality video game, a user can be controlling a computer player or vehicle in the virtual environment by manipulating the mouse 12 and wheel 16.

There are two primary "control paradigms" of operation for mouse 12: position control and rate control. Position control is the more typical control paradigm for mouse and similar controllers, and refers to a mapping of mouse 32 in which displacement of the mouse in physical space directly dictates displacement of a graphical object. Under a position control mapping, the computer object does not move unless the user manipulandum is in motion. Also, "ballistics" or other non-linear adjustments to cursor position can be used, in which, for example, small motions of the mouse have a different scaling factor for cursor movement than large motions of the mouse, to allow more control of small cursor movement. As shown in FIG. 1, the host computer may have its own "host frame" 28 which is displayed on the display screen 20. In contrast, the mouse 12 has its own "local frame" 30 in which the mouse 12 is moved. In a position control paradigm, the position (or change in position) of a user-controlled graphical object, such as a cursor, in host frame 30 corresponds to a position (or change in position) of the mouse 12 in the local frame 28.

Rate control is also used as a control paradigm. This refers to a mapping in which the displacement of a user manipulandum along one or more provided degrees of freedom is abstractly mapped to motion or rate of a computer-simulated object under control. There is not a direct physical mapping between physical object (mouse) motion and computer object motion.

The mouse 12 is useful for both position control ("isotonic") tasks and rate control ("isometric") tasks. For example, as a traditional mouse, the position of mouse 12 in its local frame 30 workspace can be directly mapped to a position of a cursor in host frame 28 on display screen 20 in a position control paradigm. Also, the mouse wheel 16 can be rotated in its degree of freedom against an opposing output force to command rate control tasks in an isometric mode. Wheel 16 can also be used for position control tasks, as described in greater detail below.

Figure 2:
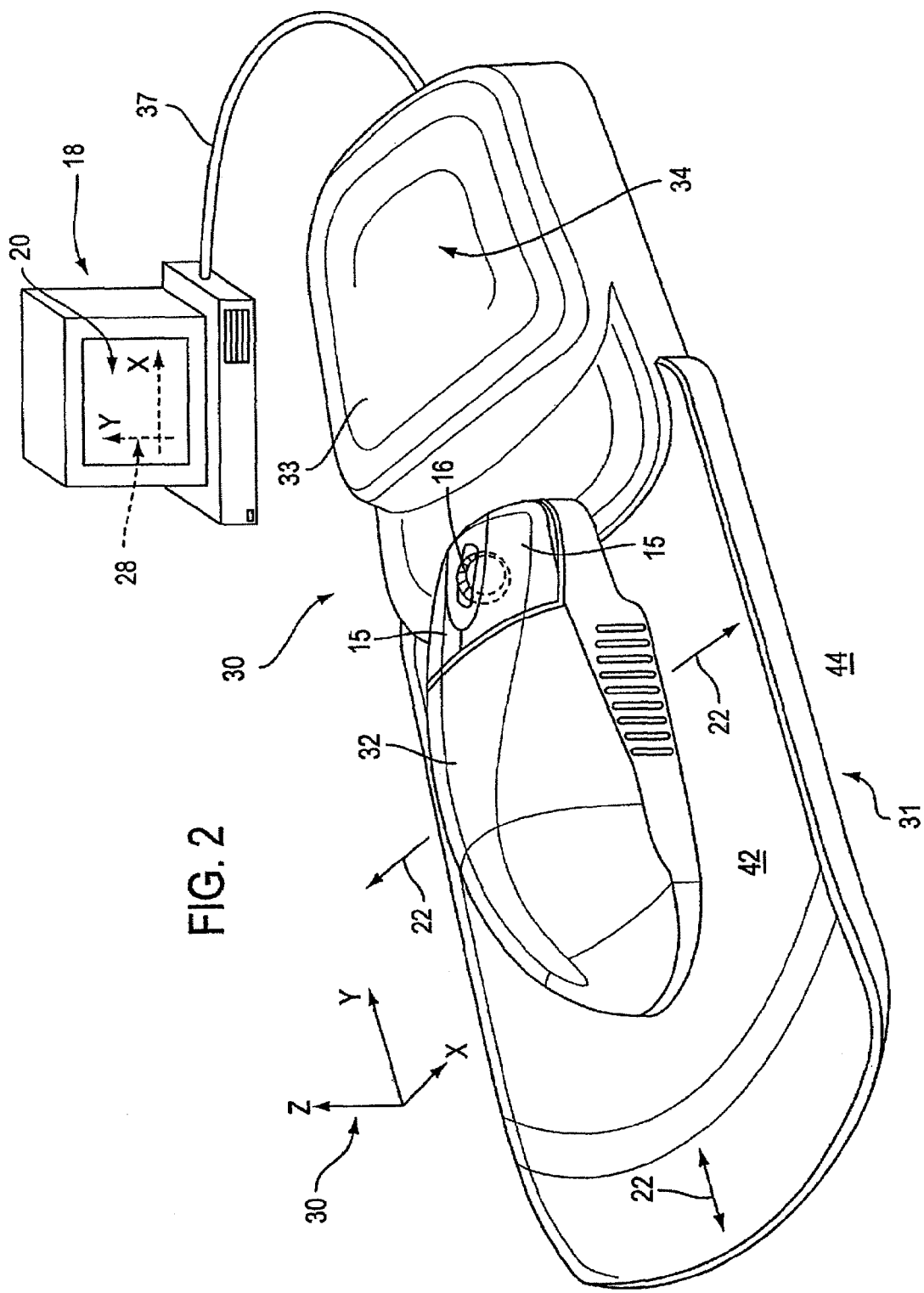
FIG. 2 is a perspective view of a second embodiment of a force feedback mouse interface system including the force feedback wheel of the present invention.

FIG. 2 is a perspective view of a second embodiment 30 of a mouse device using the force feedback mouse wheel 16 of the present invention. Force feedback mouse interface system 30 is capable of providing input to a host computer based on the user's manipulation of the mouse and capable of providing force feedback to the system based on events occurring in a program implemented by the host computer. Mouse device 30 includes added force feedback functionality over the embodiment 12 of FIG. 1 in that the planar degrees of freedom of mouse 32 are provided with force feedback in addition to the wheel 16 being provided with force feedback. Mouse system 30 includes an interface device 31 including a mouse 32 and an interface 34; and a host computer 18.

Mouse 32, similar to mouse 12 of FIG. 1, is an object that is preferably grasped or gripped and manipulated by a user. In the described embodiment, mouse 32 is shaped so that a user's fingers or hand may comfortably grasp the object and move it in the provided degrees of freedom in physical space. One or more buttons 15 allow the user to provide additional commands to the computer system. A thumb button (not shown) can also be provided on mouse 32. One or more of the buttons 15 may command specific force feedback features of the system 30, as described below. Mouse 32 is preferably supported upon a grounded pad 42, which is supported by grounded surface 44.

It will be appreciated that a great number of other types of user manipulandums ("user manipulatable objects" or "physical objects") can be used with the method and apparatus of the present invention in place of or in addition to mouse 32. For example, such objects may include a sphere, a puck, a joystick, cubical- or other-shaped hand grips, a receptacle for receiving a finger or a stylus, a flat planar surface like a plastic card having a rubberized, contoured, and/or bumpy surface, or other objects. Other examples of a user object 32 are described below with reference to FIGS. 3a and 3b.

Mouse 32 (or other manipulandum) is also provided with a mouse wheel 16 as described with reference to FIG. 1. Mouse wheel 16 is provided with force feedback separately from the mouse 32, e.g. an actuator separate from actuators that drive mouse 32 can be used to provide forces on wheel 16. The functions controlled by wheel 16 can be independent of the functions controlled by the planar movement of mouse 32 in its workspace. Alternatively, the functions controlled by wheel 16 can be synchronized or added to functions controlled by planar mouse movement, as described in greater detail below. Wheels 16 in different orientations, or multiple wheels or a trackball, can be provided on mouse 32 as described with reference to mouse 12.

Interface 34 is provided in a housing 33 of the mouse interface device 31 and interfaces mechanical and electrical input and output between the mouse 32 and host computer 18. Interface 34 provides multiple degrees of freedom to mouse 32; in the preferred embodiment, two linear, planar degrees of freedom are provided to the mouse, as shown by arrows 22. In other embodiments, greater or fewer degrees of freedom can be provided, as well as rotary degrees of freedom. A mechanical linkage (not shown) preferably couples the mouse 32 to sensors and actuators of the device 31; some examples of such a linkage are described in copending patent applications Ser. Nos. 08/881,691 and 08/965,720, both incorporated by reference herein.

In a preferred embodiment, the user manipulates mouse 32 in a planar workspace, and the position of mouse 32 is translated into a form suitable for interpretation by position sensors of the interface 34. The sensors track the movement of the mouse 32 in planar space and provide suitable electronic signals to an electronic portion of interface 34. The interface 34 provides position information to host computer 18. An electronic portion of interface 34 may be included within the housing 33 to provide electronic signals to host computer 18, as described below with reference to FIG. 4. In addition, host computer 18 and/or interface 34 provide force feedback signals to actuators coupled to interface 34, and actuators generate forces on members of the mechanical portion of the interface 34 to provide forces on mouse 32 in provided or desired degrees of freedom and on wheel 16 in its rotary degree of freedom. The user experiences the forces generated on the mouse 32 as realistic simulations of force sensations such as jolts, springs, textures, "barrier" forces, and the like.

The interface 34 can be coupled to the computer 18 by a bus 37, which communicates signals between interface 34 and computer 18 and also, in the preferred embodiment, provides power to the interface 34 (e.g. when bus 17 includes a USB interface). In other embodiments, signals can be sent between interface 34 and computer 18 by wireless transmission/reception. The interface 34 can also receive inputs from other input devices or controls that are associated with mouse system 30 and can relay those inputs to computer 18, such as buttons 15.

Host computer 18 is described above with reference to FIG. 1. The host application program checks for input signals received from the mouse 32, and outputs force values and/or commands to be converted into forces on mouse 32 and on wheel 16. Suitable software drivers which interface force feedback application software with computer input/output (I/O) devices are available from Immersion Human Interface Corporation of San Jose, Calif.

Mouse system 30 can be used for both position control and rate control. Under a position control mapping, the positions of mouse 32 and a graphical object such as a cursor are directly mapped, as in normal mouse operation. "Ballistics", as described above, can also be provided; several different ways of implementing ballistics and other control adjustments in a for feedback device are described in co-pending patent application Ser. No. 08/924,462, filed Aug. 23, 1997 and incorporated by reference herein, and these adjustments can be used in mouse system 30 if desired. Mouse system 30 can also provide a rate control mode in which the displacement of mouse 32 in a particular direction against an opposing output force can command rate control tasks in an isometric mode, as described in patent application Ser. No. 08/756,745, incorporated by reference herein. Furthermore, mouse wheel 16 can also control position and/or rate control tasks independently of the position of the mouse 32 in its workspace, as described in greater detail below.

The mouse system 10 can also include an indexing function or "indexing mode" which allows the user to redefine the offset between the positions of the mouse 32 in the local frame 30 and a user-controlled graphical object, such as a cursor, in the host frame 28. Such a mode is described in greater detail in co-pending application Ser. No. 08/924,462. A hand weight safety switch can also be provided as described in greater detail in parent patent applications Ser. Nos. 08/756,745 and 08/881,691. Other features of the present invention are also provided using force feedback functionality. For example, a thumb button (not shown) or other button 15 can toggle a force functionality mode in which designated graphical objects or regions displayed on screen 20 have other functions enabled by force feedback to wheel 16. This is described in greater detail with respect to FIG. 9.

Figure 3A:
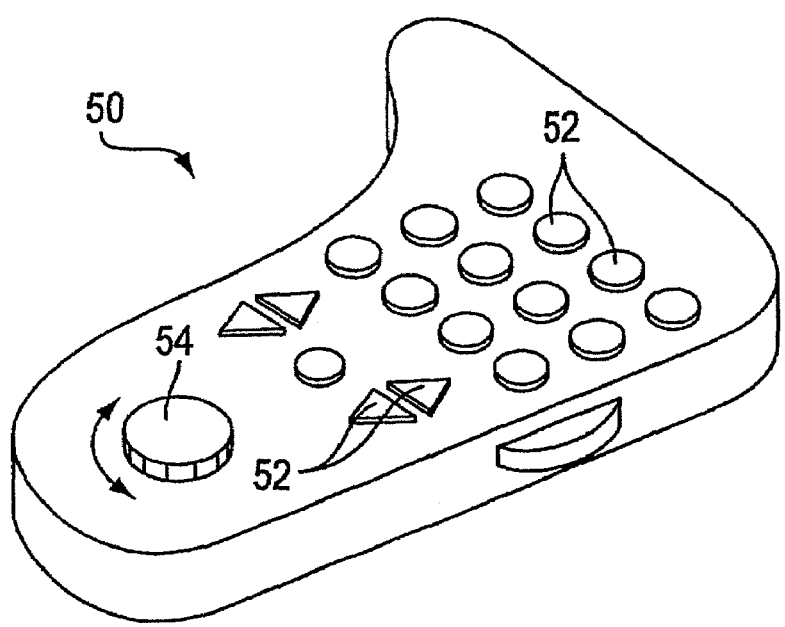
FIGS. 3a and 3b are perspective views of alternate embodiments of an interface device including the force feedback wheel of the present invention.
Figure 3B:
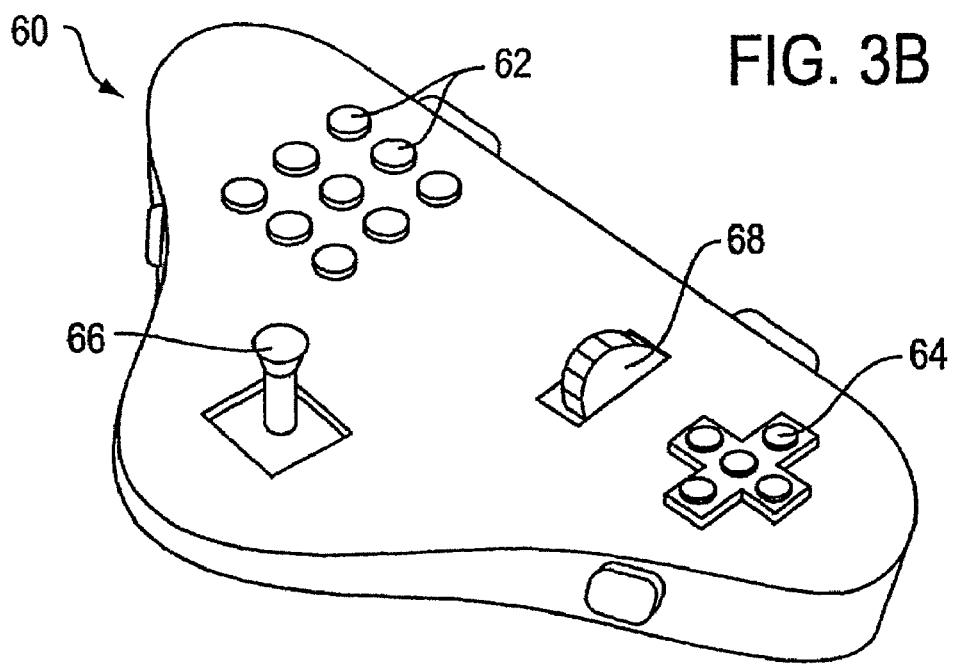

FIGS. 3a and 3b illustrate other embodiments of an interface device and user manipulandum which can incorporate the features of the present invention. In FIG. 3a, a hand-held remote control device 50 can be used to access the functions of an electronic device or appliance remotely by a user. For example, remote control 50 can be used to select functions of a television, video cassette recorder, sound stereo system, home computer, kitchen appliance, etc. Such control devices typically provide wireless operation by transmitting input signals using an electromagnetic beam that is detected by a detector on the electronic device. Or, remote control 50 can select functions of an internet or network computer connected to a television. For example, one popular device is Web-TV™, which is connected to a television and displays internet information such as web pages on the television screen. Remote control 50 may include buttons 52 for selecting options of the device or appliance, of the application program running on the device, of web pages, etc. Herein, the term "electronic device" is intended to include all such devices as well as a host computer 18 as described above.

Remote control 50 also includes a control knob 54 (which is also considered a "wheel" as referenced herein). Knob 54 can be oriented with an axis of rotation approximately perpendicular to the surface of the device 50, as shown in FIG. 3a. Alternatively, the knob 54 can be oriented similarly to the mouse wheel 16, with the axis of rotation approximately parallel to the device surface. Knob 54 is provided with force feedback similarly to the mouse wheel 16 described with reference to FIGS. 1 and 2 to control a variety of functions of the controlled device or appliance, where the force feedback is integrally implemented with the control functions. For example, force detents can be provided by an actuator on knob 54, which are forces that attract the knob to a particular rotational position and resist movement of the knob away from that position. The position can correspond to a particular network or station broadcast on the television, thus making channel selection easier for the user. Alternatively, a force detent does not provide attraction or repulsive forces, but instead provides a force "bump" to indicate a particular position on the knob has been rotated past. Additional knobs with such detents can be provided for additional functions, such as volume control for sound speakers, fast forward or rewind of a video cassette recorder or computer-displayed movie (such as a DVD movie), scrolling a displayed document or web page, etc. Alternatively, a single knob 54 can be used for a variety of different functions, where the function of the knob (volume, channel selection, etc.) can be selected with a separate button or switch.

Another type of force sensation that can be output on knob 54 is a spring force. The spring force can provide resistance to rotational movement of the knob in either direction to simulate a physical spring on the knob. This can be used, for example, to "snap back" the knob to its rest or center position after the user lets go of the knob, e.g. once the knob is rotated past a particular position, a function is selected, and the user releases the knob to let the knob move back to its original position. An isometric rate-control mode for use with such a spring force is described below. A damping force sensation can also be provided on knob 54 to slow down the rotation of the knob, allowing more accurate control by the user. Furthermore, any of these force sensations can be combined together for a single knob 54 to provide multiple simultaneous force effects. Other forces usable with knob 54 are described in greater detail below with respect to FIG. 9.

Knob 54 can similarly be provided directly on a radio, tuner, amplifier, or other electronic device, rather than on remote control 50. For example, a radio in a car that includes knob 54 can use force feedback "snap-to" detents for the favorite station frequencies preprogrammed by the user. This is convenient since the preferred radio frequencies are most likely spaced at irregular intervals in the radio frequency range; the ability to program the detents at any location in the range is desired. In addition, the knob can be moved by the actuators to select the nearest preprogrammed station, or a wide variety of different force sensations can be output. Furthermore, as described above, the detects can be used for different functions on the same knob, such as volume, tone, balance, etc. Alternatively, different sets of detent force profiles can be stored in a memory device on the radio and a particular set can be provided on the knob 54 by a microprocessor in the radio.

FIG. 3b shows another embodiment in which a gamepad controller 60 is provided with a force feedback wheel. Controller 60 is intended to be held by both hands of a user. The controller 60 can include the standard input devices of game controllers, such as buttons 62, a directional game pad 64, and a fingertip joystick 66. The joystick 66 can in some embodiments be provided with force feedback, as described in greater detail in copending application Ser. No. 08/965,720. A finger wheel 68 can also be provided on controller 60 at any of various locations on the controller. Wheel 68 can operate similarly to the mouse wheel 16 described with reference to FIGS. 1 and 2, or to the knob 54 described with reference to FIG. 3a. For example, wheel 68 can operate as a throttle or thrust control in a game for a simulated vehicle and include force feedback in an isometric mode or isotonic mode, or the wheel can be used to guide a pointer or other object on the screen.

Figure 4:
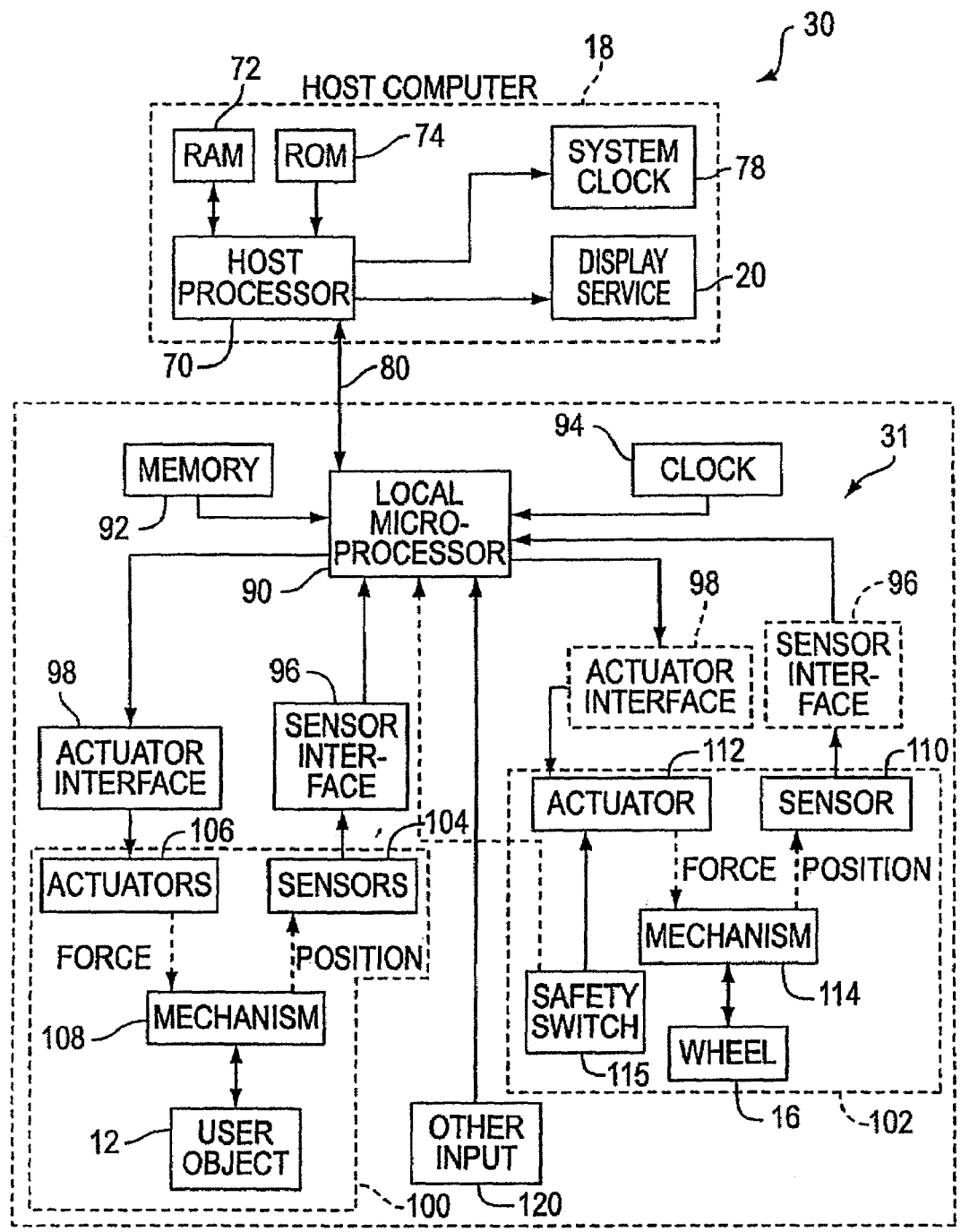
FIG. 4 is a block diagram of the interface system including a force feedback wheel of the present invention.

FIG. 4 is a block diagram illustrating an interface of the mouse system 30 of FIG. 2 suitable for use with the present invention. Mouse system 30 includes a host computer 18 and interface device 31. A similar force feedback system including many of the below components is described in detail in co-pending patent applications Ser. Nos. 08/566,282 and 08/756,745, which are incorporated by reference herein in their entirety.

Host computer 18 is preferably a personal computer, workstation, video game console, or other computing or display device, as explained with reference to FIG. 1. Host computer system 18 commonly includes a host microprocessor 70, random access memory (RAM) 72, read-only memory (ROM) 74, a clock 78, and a display device 20. Host microprocessor 70 can include a variety of available microprocessors from Intel, AMD, Motorola, or other manufacturers. Microprocessor 108 can be single microprocessor chip, or can include multiple primary and/or co-processors. Microprocessor 108 preferably retrieves and stores instructions and other necessary data from RAM 72 and ROM 74 as is well known to those skilled in the art. In the described embodiment, host computer system 18 can receive sensor data or a sensor signal via a bus 80 from sensors of system 10 and other information. Microprocessor 70 can receive data from bus 120 using I/O electronics, and can use the I/O electronics to control other peripheral devices. Host computer system 18 can also output commands to interface device 31 via bus 120 to cause force feedback.

Clock 78 is a standard clock crystal or equivalent component which can be used by host computer 18 to provide timing to electrical signals used by host microprocessor 70 and other components of the computer system 18. Display device 20 is described with reference to FIG. 1. Other types of peripherals can also be coupled to host processor 70, such as storage devices (hard disk drive, CD ROM drive, floppy disk drive, etc.), printers, audio output devices, and other input and output devices.

Interface device 31 is coupled to host computer system 18 by a bi-directional bus 120. The bi-directional bus sends signals in either direction between host computer system 18 and the interface device 104. Bus 120 can be a serial interface bus providing data according to a serial communication protocol, a parallel bus using a parallel protocol, or other types of buses. An interface port of host computer system 18 connects bus 120 to host computer system 18. In another embodiment, an additional bus can be included to communicate between host computer system 18 and interface device 11. One preferred serial interface bus used in the present invention is the Universal Serial Bus (USB). USB can also source power to drive actuators 64 and other devices of device 31.

The electronic portion of interface device 31 includes a local microprocessor 90, local clock 92, local memory 94, sensor interface 96, and actuator interface 98. Additional electronic components may also be included for communicating via standard protocols on bus 120. These components can be included in device 31 or host computer 18 if desired.

Local microprocessor 90 preferably coupled to bus 120 and is considered "local" to interface device 31, where "local" herein refers to processor 90 being a separate microprocessor from any processors 70 in host computer 18, and to processor 90 being dedicated to force feedback and sensor I/O of the interface device 31. Microprocessor 90 can be provided with software instructions to wait for commands or requests from host computer 18, parse/decode the command or request, and handle/control input and output signals according to the command or request. In addition, processor 90 preferably operates independently of host computer 18 by reading sensor signals and calculating appropriate forces from those sensor signals, time signals, and force processes selected in accordance with a host command, and output appropriate control signals to the actuators. Suitable microprocessors for use as local microprocessor 90 include the 8X930AX by Intel, the MC68HC711E9 by Motorola and the PIC16C74 by Microchip, for example. Microprocessor 90 can include one microprocessor chip, or multiple processors and/or co-processor chips, and can include digital signal processor (DSP) functionality. Also, "haptic accelerator" chips can be provided which are dedicated to calculating velocity, acceleration, and/or other force-related data.

For example, in one host-controlled embodiment that utilizes microprocessor 90, host computer 18 can provide low-level force commands over bus 120, which microprocessor 90 directly transmits to the actuators. In a different local control embodiment, host computer system 18 provides high level supervisory commands to microprocessor 90 over bus 120, and microprocessor 90 manages low level force control loops to sensors and actuators in accordance with the high level commands and independently of the host computer 18. In the local control embodiment, the microprocessor 90 can independently process sensor signals to determine appropriate output actuator signals by following the instructions of a "force process" that may be stored in local memory and includes calculation instructions, formulas, force magnitudes, and/or other data. The force process can command distinct force sensations, such as vibrations, textures, jolts, or even simulated interactions between displayed objects. The host can send the local processor a spatial layout of objects in the graphical environment so that the microprocessor has a mapping of locations of graphical objects like enclosures and can determine interactions with the cursor locally. Such operation of local microprocessor in force feedback applications is described in greater detail in co-pending patent application Ser. Nos. 08/566,282, 08/571,606, 08/756,745, and 08/924,462, all of which are incorporated by reference herein. In an alternate embodiment, no local microprocessor 90 is included in interface device 31, and host computer 18 directly controls and processes all signals to and from the interface device 31.

A local clock 92 can be coupled to the microprocessor 90 to provide timing data, similar to system clock 78 of host computer 18 to, for example, compute forces to be output by actuators 106 and 112. In alternate embodiments using the USB communication interface, timing data for microprocessor 90 can be retrieved from the USB interface. Local memory 94, such as RAM and/or ROM, is preferably coupled to microprocessor 90 in interface device 31 to store instructions for microprocessor 90, temporary and other data, calibration parameters, adjustments to compensate for sensor variations can be included, and/or the state of the force feedback device.

Sensor interface 96 may optionally be included in device 31 to convert sensor signals to signals that can be interpreted by the microprocessor 90 and/or host computer system 18. For example, sensor interface 96 can receive signals from a digital sensor such as an encoder and convert the signals into a digital binary number. An analog to digital converter (ADC) can also be used. Such circuits, or equivalent circuits, are well known to those skilled in the art. Alternately, microprocessor 90 or host computer 18 can perform these interface functions. Actuator interface 98 can be optionally connected between the actuators 106 and 112 and microprocessor 90 to convert signals from microprocessor 90 into signals appropriate to drive the actuators. Interface 98 can include power amplifiers, switches, digital to analog controllers (DACs), and other components, as well known to those skilled in the art. In alternate embodiments, interface 98 circuitry can be provided within microprocessor 90 or in the actuators.

In a preferred embodiment, power is supplied to the actuators 106 and 112 and any other components (as required) by the USB. Alternatively, power from the USB can be stored and regulated by device 31 and thus used when needed to drive actuators 106 and 112. Or, a power supply can optionally be coupled to actuator interface 98 and/or actuators 106 and 112 to provide electrical power.

A mechanical portion 100 is included in device 31 for the force feedback functionality of mouse 12. A suitable mechanical portion 100 is described in detail in co-pending application Ser. No. 08/965,720. A separate mechanical portion 102 is preferably provided for the force feedback functionality of wheel 16, as described in detail below with reference to FIGS. 5-8. In those embodiments not including force feedback in the planar mouse workspace (such as in FIG. 1), the mechanical portion 100 need not be included. Furthermore, the embodiment of FIG. 1 need not include a local microprocessor 90 or mechanical portion 100, where host computer 18 directly controls all forces on wheel 16.

Mechanical portion 100 preferably includes sensors 104, actuators 106, and mechanism 108. Sensors 104 sense the position, motion, and/or other characteristics of mouse 32 along one or more degrees of freedom and provide signals to microprocessor 90 including information representative of those characteristics. Typically, a sensor 104 is provided for each degree of freedom along which mouse 32 can be moved, or, a single compound sensor can be used for multiple degrees of freedom. For example, one sensor can be provided for each of two planar degrees of freedom of mouse 32. Examples of sensors suitable for embodiments described herein include optical encoders, analog sensors such as potentiometers, Hall effect magnetic sensors, optical sensors such as a lateral effect photo diodes, tachometers, and accelerometers. Furthermore, both absolute and relative sensors may be used.

Actuators 106 transmit forces to mouse 32 in one or more directions along one or more degrees of freedom in response to signals output by microprocessor 90 and/or host computer 18, i.e., they are "computer controlled." The actuators 106 produce "computer-modulated" forces which means that microprocessor 90, host computer 18, or other electronic device controls the application of the forces. Typically, an actuator 106 is provided for each degree of freedom along which forces are desired to be transmitted. Actuators 106 can include active actuators, such as linear current control motors, stepper motors, pneumatic/hydraulic active actuators, a torquer (motor with limited angular range), voice coil actuators, etc. Passive actuators can also be used, including magnetic particle brakes, friction brakes, or pneumatic/hydraulic passive actuators, and generate a damping resistance or friction in a degree of motion. In some embodiments, all or some of sensors 104 and actuators 106 can be included together as a sensor/actuator pair transducer.

Mechanism 108 is used to translate motion of mouse 32 to a form that can be read by sensors 104, and to transmit forces from actuators 106 to mouse 32. A preferred mechanism 108 is a closed-loop five-member linkage as described above in co-pending application Ser. No. 08/965,720. Other types of mechanisms can also be used, as disclosed in co-pending patent applications Ser. Nos. 08/374,288, 08/400,233, 08/489,068, 08/560,091, 08/623,660, 08/664,086, 08/709,012, and 08/736,161, all incorporated by reference herein. In the embodiment of FIG. 1, mouse 12 typically has a ball and roller mechanism to sense the motion of the mouse, as is well known to those skilled in the art. User object 32 is preferably a mouse but can alternatively be a joystick, remote control, or other device or article, as described above.

Mechanical portion 102 interfaces the wheel 16 with the host computer 18. Portion 102 includes a sensor 110, an actuator 112, a mechanism 114, and wheel 16. Sensor 110 can be any suitable sensor for detecting the rotary motion of wheel 16, such as an optical encoder, potentiometer, or other varieties as described above for sensors 104. Alternatively, sensor 110 can be a linear sensor that senses linear motion of mechanism 114 converted from the rotary motion of wheel 16. Sensor 110 can be an absolute sensor, where absolute positions of the wheel in the range of motion are reported to host computer 18; or a relative sensor, in which changes in position from a previous position are reported to the host computer. Sensor 110 can be directly coupled to the user object 12 or 32, be coupled through a drive mechanism, or can be decoupled from the user object (e.g. by sensing motion using electromagnetic beam detectors and emitters).

Actuator 112 is any suitable actuator for providing rotary forces on wheel 16 and produces "computer-modulated" forces as referred to above similarly to actuators 106. In the preferred embodiment, actuator 112 is a DC current control motor that has a small enough size to fit into a small manipulandum such as a mouse and a small enough weight as to not interfere with mouse planar movement. Thus, the forces provided on wheel 16 may be small, but since the finger of a user is typically quite sensitive, small magnitude forces are sufficient to convey a variety of force sensations. In other embodiments, different types of active or passive actuators can be used as described above with reference to actuators 106. For example, passive actuators such as a magnetic particle brake, a friction brake, an electrorheological fluid actuator, or a magnetorheological fluid actuator, are quite suitable for use as actuator 112 due to their smaller size and weight and reduced power requirements. If such passive actuators are used, then a desired amount of play can be provided between actuator and wheel 16 to allow sensing of the wheel when the actuator is activated; as described in greater detail in co-pending patent application Ser. No. 08/400,233 and U.S. Pat. No. 5,721,566, both incorporated by reference herein.

Also, a drive mechanism such as a capstan drive mechanism can be used to provide mechanical advantage to the forces output by actuator 112. Some examples of capstan drive mechanisms are described in co-pending patent applications Ser. Nos. 08/961,790, 08/736,161, 08/374,288, all incorporated by reference herein. Alternatively, a belt drive system can be used as described below with reference to FIG. 8.

In the described embodiment, the sensor 110 can input signals to a single sensor interface 96 used also for sensors 104 as described above. Actuator 112 can similarly use the actuator interface 98 also used by actuators 106. Alternatively, sensor 110 and/or actuator 112 can be provided with their own dedicated interfaces separate from interfaces 96 and 98.

Figure 5:
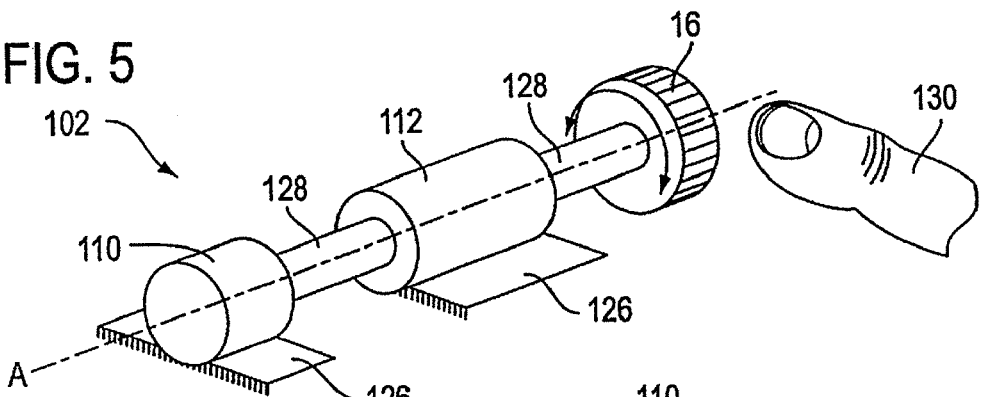
FIGS. 5 and 6 are perspective views of two embodiments of a direct drive mechanical portion of the interface device for the force feedback wheel.
Figure 6:
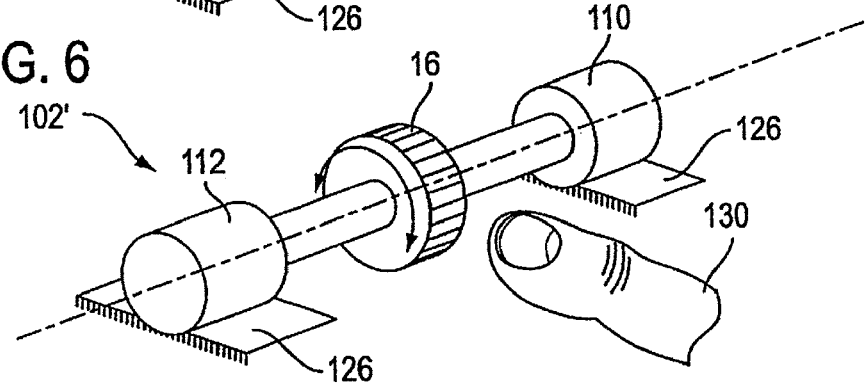
Figure 7:
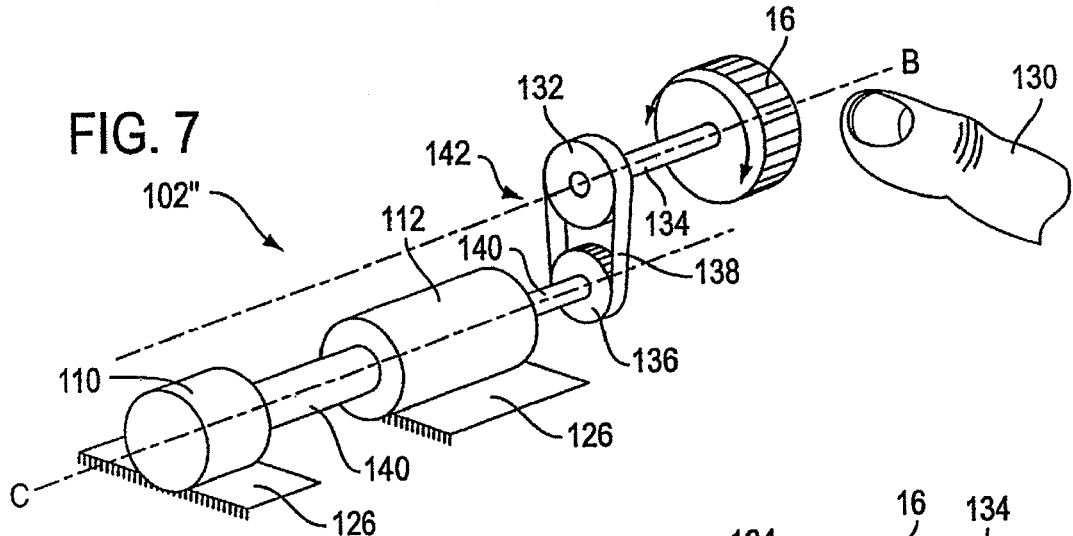
FIG. 7 is a perspective view of an embodiment of a belt drive mechanical portion of the interface device for the force feedback wheel.
Figure 8:
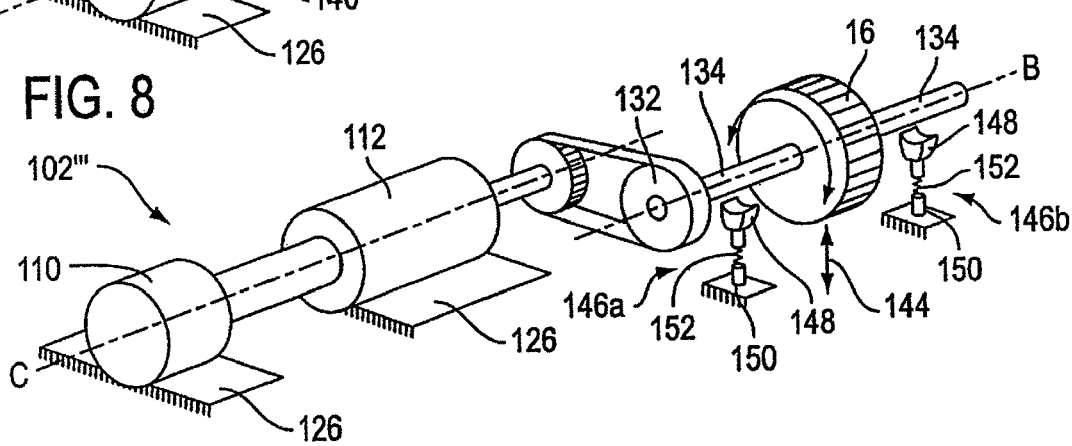
FIG. 8 is a perspective view of an embodiment of a belt drive mechanism allowing the wheel to be depressed like a button.

Mechanism 114 is provided to allows sensor 110 to sense the rotary motion of wheel 16 and to transmit rotary forces to the wheel 16 from actuator 112. Mechanism 114 can be a simple direct coupling of actuator 114 and sensor 112 to the wheel 16, as shown in FIGS. 5-6. Alternatively, a more complex mechanism can be used, such as a mechanism including a transmission system (e.g. a belt drive or capstan drive) as shown in FIGS. 7-8.

Other input devices 120 can be included in interface device 31 and send input signals to microprocessor 90 and/or host computer 18. Such input devices can include buttons, such as buttons 15 on mouse 12 or 32, used to supplement the input from the user to a GUI, game, simulation, etc. running on the host computer. Also, dials, switches, voice recognition hardware (e.g. a microphone, with software implemented by host 18), or other input mechanisms can be used. Furthermore, a safety or "deadman" switch can also be included to send a signal (or cease sending a signal) to microprocessor 90 and/or host 18 indicating that the user is not gripping the manipulandum 12 or 32, at which point the microprocessor 90 and/or host 18 commands the cessation of all output forces for safety purposes. Such safety switches are described in co-pending U.S. Pat. No. 5,691,898.

Furthermore, a safety switch 115 can be included for the wheel 16 to prevent forces from being output on the wheel when the user is not contacting or using it, and to prevent the wheel from spinning on its own when the user is not touching it. In one embodiment, the safety switch detects contact of a user's digit (finger, thumb, etc.) with the wheel. Such a switch can be implemented as a capacitive sensor or resistive sensor, the operation of which is well known to those skilled in the art. In a different embodiment, a switch or sensor that detects downward pressure on the wheel 16 can be used. For example, a switch can be sensitive to a predetermined amount of downward pressure, which will close the switch. A button switch for wheel 16 similar to that described below with reference to FIG. 8, for example, can function as a safety switch. Or, a two-state switch can be used, where the first state is entered when a small amount of pressure is applied to wheel 16, functioning as the safety switch; and the second state is entered with a greater amount of pressure to activate a button switch and send a button signal. Alternatively, a pressure magnitude sensor can be used as the safety switch, where forces are output on the wheel only when a downward pressure magnitude over a minimum threshold is sensed. A pressure requirement for safety switch 115 has the advantage of ensuring good contact between finger and wheel before forces are output; output forces are enabled only when the user is moving or actively using the wheel. Thus, if the user simply rests his or her finger lightly on the wheel without intending to use it, no forces will be output to surprise the user.

FIG. 5 is a perspective view of a first embodiment of the mechanical portion 102 for a force feedback wheel (e.g. mouse wheel or knob) including a direct drive mechanism. Sensor 110 and actuator 112 are grounded (schematically shown by ground 126), and mouse wheel 16 extends partially out of an aperture in the housing of mouse 12 or 32. Mouse wheel 16 is coupled to actuator 112 by a shaft 128; thus, when the actuator applies rotary force to shaft 128 about axis A, the user's finger 130 on wheel 16 will feel the rotary force about axis A. It should be noted that if the user is applying sufficient force in the opposite direction of the rotary force, the actuator operates in a stalled condition where the wheel 16 will not physically rotate, but the user will feel the rotational force.

Sensor 110 is coupled to the shaft 128 (or a portion of actuator 112 coupled to shaft 128) to measure the rotation of the shaft about axis A and thus the rotation of the wheel 16. Sensor 110 senses the rotation of wheel 16 even when no forces are applied to the wheel by actuator 112. In the embodiment of FIG. 5, the actuator 112 is provided between the sensor 110 and the wheel 16. FIG. 6 is a perspective view of a second embodiment 102' of mechanical portion 102, where the wheel 16 is positioned between the sensor 110 and actuator 112. Embodiment 102' is more appropriate than embodiment 102 when a desired play is introduced between actuator and wheel 16, since the sensor is desired to be rigidly coupled to wheel 16 without play in such an embodiment. In other respects, the embodiment 102' functions similarly to the mechanical portion 102.

FIG. 7 is a perspective view of a third embodiment 102" of mechanical portion 102 for force feedback mouse wheel 16. Wheel 16 is coupled to a pulley 132 by a rotatable shaft 134, where pulley 132, shaft 134, and wheel 16 rotate about axis B. In this embodiment, the pulley 132, shaft 134, and wheel 16 are preferably fixed at their rotation location, i.e., axis B is fixed with respect to mouse 12 or 32. Pulley 132 is coupled to a pulley 136 by a belt 138. Pulley 136 is rigidly coupled to a shaft 140, which is coupled to actuator 112 and to sensor 110, where pulley 136, actuator 112, and sensor 110 rotate about axis C. Mechanical portion 102" thus operates similarly to the embodiment 102, except that the belt transmission system 142 that includes pulley 132, belt 138, and pulley 134 is used to scale the motion of wheel 16 and forces applied to wheel 16. For example, pulley 136 preferably has a smaller diameter than pulley 132 to allow the rotational motion of wheel 16 to be converted to a greater number of rotations of shaft 140, thus increasing the sensing resolution. Furthermore, a smaller rotation of shaft 140 translates to a greater amount of rotation of shaft 134, thus providing mechanical advantage to forces output by actuator 112 and allowing a smaller actuator to be used in mouse 12 or 32. In other embodiments, belt 138 can be a cable, or belt transmission system 142 can be a capstan drive system. Other mechanical transmission systems may also be used.

FIG. 8 is a perspective view of a fourth embodiment 102''' of mechanical portion 102 for force feedback mouse wheel 16. Embodiment 102''' is similar to embodiment 102' except that axis B is floating, i.e., may be rotated about axis C. Thus, the assembly including pulley 132, shaft 134, and wheel 16 may be rotated about axis C. This motion allows the wheel 16 to move approximately vertically with reference to the horizontal planar orientation of the mouse 12 or 32, as indicated by arrow 144. The wheel thus may be pushed down by the user into the housing of the mouse 12 or 32 like a button.

Spring contacts 146a and 146b are preferably provided in the path of the wheel 16. Contacts 146a and 146b each include a moving portion 148 that is forced toward a grounded portion 150 when the moving shaft 134 engages moving portions 148. A spring 152 is provided between each of the grounded and moving portions 150 and 148. When the moving portion 148 has been moved down enough to contact the grounded portion 150, a circuit is closed and a signal is sent to the microprocessor 90 and/or host computer 18 indicating that the wheel 16 has been pressed. The software running on the host computer can interpret the wheel-press signal to perform an associated task or process. When the user removes his or her finger from wheel 16, springs 152 force the moving portions 148 and the wheel 16 back to their original position. Other equivalent mechanisms may also be used in other embodiments to allow the wheel 16 to function as a button in addition to its rotational function. Furthermore, the contacts 146 can be used as a safety switch in some embodiments, as described above.

Figure 9:
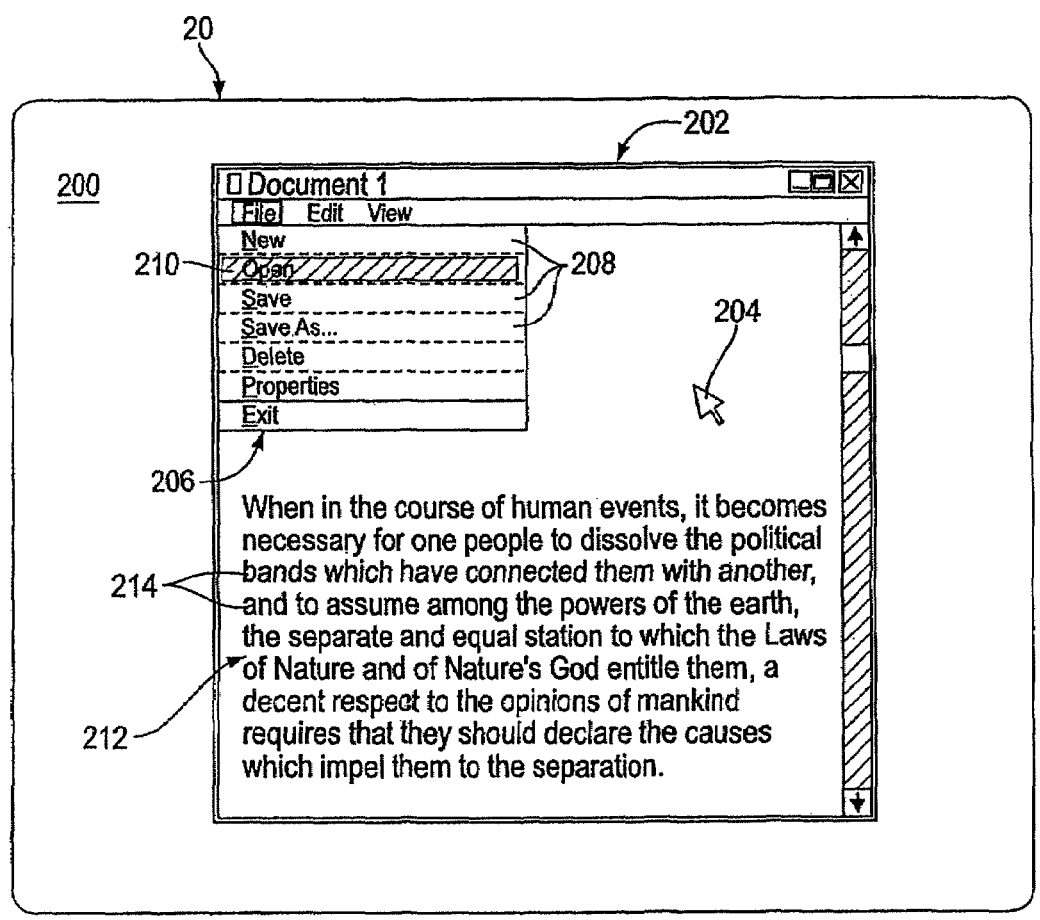
FIG. 9 is a diagrammatic illustration of a GUI and graphical objects which can be manipulated using the force feedback wheel of the present invention.

FIG. 9 is a diagrammatic view of display screen 20 of host computer 18 displaying a graphical environment for use with the present invention. In the described example, a Graphical User Interface (GUI) 200 displays a window 202 on display screen 20. A cursor or pointer 204 is a user controlled graphical object that is moved in conjunction with the mouse 12 or 32 in its planar workspace.

The force feedback wheel 16 of the present invention can be used to control and/or enhance functions of the GUI 200. A normal mouse wheel can be used to scroll a document or view of the GUI, zoom a view, or pan a view by rotating the mouse wheel. In the present invention, several types of force sensations can be output on wheel 16 to enhance control or selection in the GUI of these types of rate-control functions. Any of the described force sensations can be combined on wheel 16 to provide multiple simultaneous force effects where appropriate.

One feature of the force feedback wheel is force detents. As described above with reference to FIG. 3a, force detents are forces that attract the wheel to a particular rotational position and resist movement of the wheel away from that position, e.g. a "snap-to" detent. The detents can be programmable by an application developer or other designer/user to correspond with particular features of the GUI 200. For example, the host computer can send a high-level host command to the interface device 31 (e.g. microprocessor 90), where the host command has a command identifier and command parameters. The identifier (such as "WHEEL_DETENT") identifies the command as a force detent command, while the parameters characterize the detent forces. For example, parameters such as "θ angle of detent" and "magnitude" can be used, so that a command WHEEL_DETENT (θ, magnitude) characterizes a detent. A command of WHEEL_DETENT (20, 10) would command a wheel detent at an angle of 20 degrees on the wheel from a reference position (when viewing wheel coincident with axis of rotation), at a force magnitude of 10% of maximum force output (magnitude can also be expressed in other terms). Additional angle parameters can define additional detents located at different angles around the wheel in a range of 360 degrees, irregularly or regularly spaced as desired. Alternatively, "N pulses per revolution" can be a parameter to command N regularly-spaced force detents per revolution of the wheel. If a local microprocessor 90 is used, the microprocessor can implement the detents independently of control of the host based on the received host command.

For example, one standard GUI feature is a pull-down menu 206. Individual menu items 208 in the pull down menu 206 may be selected by the user using cursor 204. Once the pull-down menu has been displayed, the selection of a menu item 208 can be controlled by wheel 16 moving cursor 204 (and, optionally, vertical motion of mouse 12 or 32 can be disabled while the menu is displayed). For example, a menu item selection bar 210 (or highlighter) can be moved up or down menu 206 by rotating the wheel 16. The force detents can be output on wheel 16 to correspond with the spacing of menu items 208. Thus, the selection of a menu item is made easier from the use of detent forces, which substantially reduces the tendency of the user to overshoot a menu item when moving a cursor down the list of menu items. Furthermore, since the force detents are programmable, the user or software developer can set a rotational distance between detents to a particular preference, and can also set the magnitude of detent forces, e.g. for the "depth" of the detent which controls how easily the user may move the wheel past or out of a detent.

Detent forces can similarly be used for other GUI or application program features. For example, the spacing of objects on a document can be synchronized with force detents. As the document is scrolled using wheel 15, each time a particular object is scrolled past a predetermined location in a window, a force detent can be output. For example the spacing of lines 214 of text in a text document 212 can be synchronized with force detents so that if these text lines are scrolled by the cursor or other location in the window using the wheel 16, a force detent is output on the wheel 16. Similarly, the grid spacing on a spreadsheet or the links on a web page can be associated with force detents. The force detents can be spaced to correspond with the spacing of the text or other features to provide the user with greater feedback concerning the graphical features. Thus, a text document having single-spaced lines would cause force detents to be output in quick succession as the document is scrolled, while a text document having double-spaced lines would cause force detents to be output twice the rotational distance apart as the single spaced document. In other embodiments in which the wheel 16 is used to position the cursor 204 (described below), force detents can be output on wheel 16 when the cursor is moved over a particular graphical object, such as a text word, an icon, or a menu item 208. The flexibility of characterizing the computer-controlled actuator force detents makes these detents far more helpful to a user than the static mechanical detents provided in mouse wheels of the prior art.

A different force sensation which can be output on wheel 16 is a spring force or spring return force. Similarly to the knob 54 described with reference to FIG. 3a, the spring return force resists rotational motion of the wheel away from a "rest position", where the magnitude of the spring force is proportional to the distance the wheel is rotated away from the rest position. This force can cause the wheel to spring back to its rest position when the user releases the wheel. A host command such as WHEEL_SPRING (state, stiffness) can be sent to the interface device 31 to characterize the spring return force, where the state ("ON" or "OFF") turns the spring force on or off and the stiffness indicates the magnitude of spring force output on the wheel. Also, additional parameters to characterize the spring can be included in the command, such as +k and −k (spring constant and direction), dB (deadband area around designated position in which no forces are applied), and +Sat, −Sat (saturation level over which the magnitude is not increased).

Such a spring force can be useful, for example, for isometric scrolling of a document or view in GUI 200. Isometric scrolling allows the user to exert pressure to control the direction and/or speed of scrolling or other rate control tasks. Isometric scrolling can be approximated through the use of a spring force, where the user exerts a force on the wheel 16 to rotate the wheel, but the spring force resists such a user force. The speed of scrolling is based on the distance of compression of the simulated spring. For example, the further the user pushes the wheel against the spring force, the faster a document will scroll. When the user releases the wheel, the actuators move the wheel back to its rest position (or the wheel is left in its current position) and the document stops scrolling. Alternatively, the user might wish to set preferences so that the document continues to scroll even when the wheel is released, where the activation of a different command or control stops the scrolling. In a different embodiment, the distance of a scrolling window or view can be based on the distance of compression of the simulated spring in a position control paradigm. For example, a document or a first-person view in a game can scroll based directly on the amount of rotation of the wheel against the spring force; when the user releases the wheel, the spring force moves both the wheel and the document or view back to the rest position. In a different embodiment, a spring return force can be used on wheel 16 when the wheel is used to control thrust or velocity of a simulated vehicle or character in a game. Or, the spring return force can be used in conjunction with zooming or panning functions in a GUI, game, or other graphical environment.

Another force sensation that can be used with wheel 16 is a jolt or pop force sensation. For example, a jolt can be command with a command such as WHEEL_JOLT (magnitude, duration), which characterizes the magnitude of the jolt force and its duration. Such jolts can be used to indicate to the user that designated objects have scrolled past a particular location on the screen. For example, each time a page break in a text document scrolls by the cursor 204 or scrolls past the bottom of the displayed window, a jolt can be output on wheel 16. Other objects such as web page links, images, etc. can also be associated with jolts. A jolt differs from a detent in that a jolt is time-based rather than spatially based; the jolt is output irrespective of the position of the wheel 16, and does not attract or repel the wheel from a particular rotational position.

A different force sensation that can be output on wheel 16 is a vibration. Like the jolt force, this type of force "effect" is time based, not based on the rotational position of the wheel. The vibration force can be commanded with a command such as WHEEL_VIBRATION (Frequency, Waveform, Magnitude) to characterize the vibration force, where "Waveform" can be a sine wave, square wave, triangle wave, or other-shaped wave. The vibration can be associated with particular graphical objects displayed on the screen, or be output based on events that occur in a host application. For example, a vibration can be output on wheel 16 when a warning or alert message is given, such as when the user receives new mail or when an error in a program occurs.

Other force sensations that can be output on wheel 16 are inertia, friction, and/or damping force. An inertia force is based on a simulated mass of an object, where the larger the mass, the greater the force resisting motion of the object. For example, a document can be assigned a simulated mass based on a characteristic of the document, such as the file size of the document, the font used in the document, etc. A document having a larger mass has a greater inertia force associated with it, so that the wheel 16 is more difficult to rotate when scrolling a large document as compared to scrolling a smaller document. The user can perceive the force on the wheel 16 and readily discern the size of the scrolled document. A friction force depends on a predefined coefficient of friction which causes a drag force on the user manipulandum. A damping force sensation is based on the velocity of an object, where the greater the velocity, the greater the damping force. This force feels like resistance to motion through a viscous liquid. The faster wheel 16 is rotated, the greater the damping force on the wheel. This can be used, for example, to provide areas of a document where scrolling is desired to be slower or controlled to a more fine degree, or to alert the user of a particular portion of the document as it scrolls by.

Another use for wheel 16 is for "coupled control." Coupled control refers to the position of cursor 204 on screen 20 being controlled both by the position of mouse 12 or 32 in its planar workspace as well as by the rotational position of wheel 16 about its axis. In one embodiment, the Y (vertical) screen coordinate of the cursor 204 is determined by the Y position of the mouse added to the Y position of the wheel 16, as summarized by the following:

$$Y_{CURSOR} = Y_{MOUSE} + Y_{WHEEL}$$

Thus, the user can move the cursor 204 in a Y-direction on the screen by moving mouse 12 or 32 in a Y-direction in its workspace, and/or by rotating wheel 16 (where wheel 16 is preferably oriented in the Y-direction so that it rotates about an axis parallel to the plane of mouse movement and oriented in the X-direction). If the user wishes to move the cursor 204 only with the wheel 16, the mouse 12 or 32 can be kept stationary within its workspace; if the user wishes to move the cursor only with the mouse, the wheel is not moved. Furthermore, if a wheel is provided on mouse 12 or 32 for horizontal (X-direction) motion, the X position of the cursor 204 can be determined from both the X-direction of the mouse 12 or 32 in its workspace and by the rotational position of the X-oriented wheel. In other embodiments, the position control of cursor 204 by mouse 12 or 32 can be disabled at selected times to allow wheel 16 to have exclusive control of the cursor 204 position. For example, when a pull down menu 206 is selected by the user, the Y position of the mouse 12 or 32 can be ignored to allow the wheel 16 to exclusively control the Y position of the cursor 204 as the user is selecting a menu item 208 in the menu 206. One analogy to such dual mouse-wheel cursor control is a "reel metaphor", in which the wheel can be considered a reel of rigid string (or controlling the length of a telescoping pole), where the reel is positioned on the mouse 12 or 32 and the cursor 204 is attached to the end of the string (or pole). Assuming the string is fully wound on the reel (or pole is fully contracted), the mouse controls the position of the cursor directly. When the wheel is moved and the string unwound (or pole is expanded), the cursor has additional movement beyond the motion controlled by the mouse. The user can push or pull on graphical objects by winding or unwinding the reel, and feel the appropriate forces from such actions through the wheel 16.

When force feedback wheel 16 is used to control the position of cursor 204, force sensations can provide enhanced control and tactile information to the user. For example, when the user moves the cursor 204 against a graphical object designated as a wall or other obstruction using wheel 16, a wall force can be output on the wheel 16 to resist further motion of the wheel and cursor into the wall. One way to implement such a wall is to output a spring force on the wheel, calculated as $F_Y = K \Delta Y_{CURSOR}$, where K is a spring constant and $\Delta Y_{CURSOR}$ is the distance of penetration of the cursor into the wall surface along the Y axis resulting from the sum of both wheel Y motion and mouse Y motion. To make the wall seem like it is impassable, the cursor is preferably continued to be displayed against the wall surface even as the wheel 16 is rotated to penetrate the wall spring force; such a breaking of the mapping between cursor and physical manipulandum in a position control paradigm is explained in greater detail in copending patent application Ser. No. 08/664,086, incorporated by reference herein.

Other force sensations can also be output on wheel 16 when the wheel controls the position of the cursor. For example, a texture force can be output on the wheel when the cursor is moved over a textured region or object. Examples of textures include a bumpy surface and a slick icy surface. Alternatively, spring forces, damping forces, inertia forces, frictional forces, barrier forces, ramping effect forces, or dynamic effects as described in copending patent application Ser. No. 08/846,011, incorporated by reference herein, can all be output on the wheel 16 and associated with the motion of the cursor and/or the interaction of the cursor with other graphical objects in GUI 200. Also, one or more of these forces can be combined with one or more other forces to create compound force sensations on wheel 16.

Furthermore, force profiles may be used to control the forces on wheel 16. Force profiles are sequences of individual force magnitudes that have been stored in a storage device such as local memory 92, host RAM 74, a hard disk drive, floppy disk, CD-R or CD Reewritable, DVD, or other storage device. The force magnitudes can be output by microprocessor 90 to the actuator 112 in sequence to apply a particular force sensation characterized by the force profile. The microprocessor can output the force profile magnitudes (or a subset thereof) at different rates or with different offsets from the stored magnitudes as commanded by host computer 18 and/or as a function of characteristics, such as wheel velocity/acceleration/current position, time, etc.

The force feedback functionality of wheel 16 described above can also be provided in different modes of the interface device 12 or 31, where the user, microprocessor 90, and/or host computer 18 can control which mode is currently active. Examples of two preferred modes are isotonic mode and isometric mode. Example of similar isometric and isotonic modes for mouse 12 or 32 are also described in copending patent application Ser. No. 08/756,745.

Isotonic mode is a position control mode for wheel 16, where the forces output on the wheel are synchronized or associated with the position of the wheel, and where the position of the wheel, when changed, incrementally changes the position or state of a graphical object provided by the host computer. For example, when a position control scrolling is provided by wheel 16, a document is scrolled by an amount corresponding to the amount the wheel is rotated. Similarly, the coupled control described above is a position control function, since a cursor is incrementally moved based on incremental rotations of the wheel 16.

Force sensations that are appropriate for such a position control wheel mode include force detents. For example, as explained above, force detents are output on the wheel depending on when text lines or spread sheet cells are scrolled by, where each detent is incrementally output as a document is scrolled, zoomed, panned, etc. Damping, friction, and inertia forces are also position control mode forces, where the force depends on the velocity (which is position based) or the position of the wheel and the cursor, document, or other object which is directly controlled by the wheel. Obstruction forces which represent hard stops to the wheel can be used in position control mode to represent the end of travel of the wheel; for example, when the end of a document is reached during a scrolling function, a hard stop force can be output to indicate this condition and resist further scrolling. Alternatively, a wall obstruction force on wheel 16 indicates that a wheel-controlled cursor has hit a wall. Texture forces are also appropriate in the position control mode, where the texture force is dependent on the position of the wheel; for example, in the coupled control embodiment where the wheel influences the position of the cursor, texture bump forces corresponding to bumps on the screen can be output on the wheel as the cursor moves over the bumps.

Isometric mode (or "pressure" mode) is a rate control mode for wheel 16. The distance of the wheel from a particular position controls a rate of a computer function, such as the rate of scrolling, zooming or panning, the rate of fast-forwarding/rewinding a computer-displayed movie, the rate of travel of a simulated vehicle, the rate of change for frequencies to increase when selecting radio stations, etc. An appropriate force sensation to use for such an isometric mode is the spring return force, which biases the wheel to center itself back at a starting or center position. The user feels the spring force get stronger the more the wheel is rotated from the center position, and this accordingly controls the rate of the computer function, e.g. the speed of scrolling. Detent forces can also be used in isometric mode, e.g. in conjunction with a spring return force. For example, the detents do not indicate an increment of wheel motion, but indicate the rate settings, making their selection easier for the user. Thus, a user might program three favored speed settings for the wheel in isometric mode, where the settings are indicated as force detents when the wheel is rotated to those speed settings, thereby assisting the user in finding and maintaining the wheel at those settings. In addition, jolt, vibration, or other time based forces can also be output on wheel 16 in an isometric mode, for example, to indicate events such as a page break scrolling by or the status of a simulated engine in a controlled simulated vehicle upon reaching a certain velocity.

The isotonic and/or isometric modes can be selected in a variety of ways. For example, when a button 15 is held down by the user, an isometric mode can be entered at the current location of the cursor or current displayed region of a document. When the button is released, isotonic mode can be entered. Alternatively, isometric mode can be activated when the cursor moves against an "isometric surface", as described below. Other modes can also be selected using buttons 15 or other input devices. For example, when a "cursor mode" of wheel 16 is selected, the wheel 16 can control cursor movement as explained above. When the cursor mode is inactive, the wheel 16 can control scrolling, zooming, or panning of a document/view, or other functions. Force feedback output on the wheel 16 is appropriate to the currently-selected mode. The modes can be selected by host computer 18, microprocessor 90, or the user in other ways in other embodiments.

Other modes can also be implemented for wheel 16. One type of mode is a "force functionality mode." For example, a thumb button (not shown) or other button 15 can toggle the force functionality mode in which designated graphical objects or regions displayed on screen 20 have other functions enabled by force feedback. A graphical object, such as a window or icon in a GUI, can act differently for selection of functions of the host computer or program, and/or for the forces associated with the object/region, depending on whether the force functionality mode is active. For example, when the mode is not active, the cursor can be moved normally through the border or edge of a window, with no force sensations associated with the movement over the window. However, when the force mode is active (such as by pressing or holding a particular button 15), a spring force will be output on mouse 32 and/or on wheel 16 opposing the movement of the cursor through the window border, i.e. the window border becomes an "isometric surface." This force is used as for "pressure scrolling" or as a "scroll surface", where the amount of penetration of the mouse against the spring force controls the speed of scrolling, zooming, etc. of a document displayed in that window (similar to isometric mode described above). In a "pressure clicking" or "click surface" embodiment, if the cursor is moved against the border of an icon or other object and the force functionality mode is active, a force will be output resisting motion of the cursor into the icon; when the mouse 32 and/or wheel 16 moves against the force a threshold distance, the icon is selected as if the cursor had clicked or double-clicked on the icon. Such an embodiment is described in co-pending patent application Ser. No. 08/879,296, filed Jun. 18, 1997, incorporated by reference herein. These types of features are especially applicable to wheel 16 when in the coupled cursor control embodiment described above. In other embodiments, other input devices besides or in addition to buttons 15 can control the force functionality mode. Or, different input devices can control different modes.

While this invention has been described in terms of several preferred embodiments, it is contemplated that alterations, permutations and equivalents thereof will become apparent to those skilled in the art upon a reading of the specification and study of the drawings. For example, many types of actuators, sensors, and mechanisms can be used to sense and apply forces on wheel 16. In addition, the wheel 16 itself can be implemented in a variety of ways, as a dial, cylinder, knob, or other shape; for example, wheel 16 can be provided as a trackball on mouse 12 or 32 and thus provide input in both X- and Y-directions to host computer 18. Also, a great variety of forces can be output on wheel 16, based on scrolling, panning, zooming, or cursor motion functions. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A method comprising:

sensing a position of a manipulandum as the manipulandum is moved by a user in at least two degrees of freedom, the manipulandum configured to send a first position signal associated with the sensed position of the manipulandum to a host computer, wherein the first position signal controls movement of a graphical object in a graphical user interface (GUI) in response to movement of the manipulandum;

sensing movement of a rotatable member coupled to the manipulandum as the rotatable member is operated by a user's digit, the manipulandum configured to send a second position signal associated with the sensed position of the rotatable member to the host computer, wherein the second position signal controls movement of the graphical object in the GUI in response to movement of the rotatable member; and outputting a force feedback signal to an actuator of the manipulandum when the graphical object is positioned at a designated location in the GUI the force feedback signal responsive to at least the second position signal, wherein a haptic force sensation is output by the actuator to the rotatable member in response to the actuator receiving the force feedback signal.

2. The method of claim 1 wherein the haptic sensation includes a force detent.

3. The method of claim 1 wherein the haptic sensation includes a spring force.

4. The method of claim 1 wherein the haptic sensation includes a pop force.

5. The method of claim 1 wherein the haptic sensation includes a vibration.

6. The method of claim 1 wherein the haptic sensation includes a damping force.

7. The method of claim 1 wherein a designated item is at the designated location, the designated item being a graphical menu having a plurality of individual objects, wherein the haptic sensation is output to the rotatable member when the graphical object moves to or away from an individual object in the plurality.

8. A manipulandum including a rotatable member, the manipulandum adapted to be coupled to a host computer running a software program providing a graphical user interface (GUI), the manipulandum comprising:

means for outputting a first position signal to the host computer, the first position signal associated with a sensed position of the manipulandum being moved by a user in at least two dimensions, the first position signal configured to control movement of a graphical object in the GUI;

means for outputting a second position signal to the host computer, the second position signal associated with a sensed position of the rotatable member being moved by a user's digit, the second position signal configured to control movement of the graphical object in the GUI; and means for outputting a haptic sensation to the rotatable member in response to receiving a force feedback signal from the host computer when the graphical object is sensed at a designated location in the GUI, the force feedback signal responsive to at least the second position signal.

9. The manipulandum of claim 8 wherein the haptic sensation includes a force detent.

10. The manipulandum of claim 8 wherein the haptic sensation includes a spring force.

11. The manipulandum of claim 8 wherein the haptic sensation includes a pop force.

12. The manipulandum of claim 8 wherein the haptic sensation includes a vibration.

13. The manipulandum of claim 8 wherein the haptic sensation includes a damping force.

14. The manipulandum of claim 8 wherein a designated item is at the designated location, the designated item being a graphical menu having a plurality of individual objects, wherein the haptic sensation is output to the rotatable member when the graphical object moves to or away from an individual object in the plurality.

15. A computer storable device utilized by a host computer and configured to perform a method for providing force feedback to a rotatable member of a manipulandum coupled to the host computer, the method comprising:

providing a graphical user interface (GUI) having a graphical object at the host computer, wherein the graphical object is controllable by a user operating the manipulandum;

receiving a first position signal associated with a sensed position of the manipulandum as the manipulandum is moved in at least two dimensions by the user;

receiving a second position signal associated with a sensed position of the rotatable member as the user operates the rotatable member by applying the user's digit to the rotatable member;

updating a value associated with the graphical object in response to the first or second position signals; and outputting a force feedback signal to an actuator of the manipulandum when the graphical object is positioned at a designated location in the GUI the force feedback signal responsive to at least the second position signal, wherein a haptic sensation is output by the actuator to the rotatable member in response to the actuator receiving the force feedback signal.

16. The method of claim 15 wherein the haptic sensation includes a force detent.

17. The method of claim 15 wherein the haptic sensation includes a spring force.

18. The method of claim 15 wherein the haptic sensation includes a pop force.

19. The method of claim 15 wherein the haptic sensation includes a vibration.

20. The method of claim 15 wherein the haptic sensation includes a damping force.

21. The method of claim 16 wherein a designated item is at the designated location, the designated item being a graphical menu having a plurality of individual objects, wherein the haptic sensation is output to the rotatable member when the graphical object moves to or away from an individual object in the plurality.

* * * * *

UNITED STATES PATENT AND TRADEMARK OFFICE
CERTIFICATE OF CORRECTION

PATENT NO. : 7,564,444 B2  Page 1 of 1
APPLICATION NO. : 11/252505
DATED : July 21, 2009
INVENTOR(S) : Louis B. Rosenberg et al.

It is certified that error appears in the above-identified patent and that said Letters Patent is hereby corrected as shown below:

Column 8, line 49, please delete "for", please insert --force--.

Column 16, line 6, please delete "102'", please insert --102"--.

Signed and Sealed this

Sixth Day of October, 2009

David J. Kappos
*Director of the United States Patent and Trademark Office*